United States Patent [19]

Cox et al.

[11] 3,921,300

[45] Nov. 25, 1975

[54] TEMPERATURE COMPENSATED MEASURING GAUGE

[75] Inventors: Joe T. Cox; Thomas E. Prince, both of Louisville, Ky.

[73] Assignee: The United States of America as represented by the Secretary of the Navy, Washington, D.C.

[22] Filed: Aug. 16, 1974

[21] Appl. No.: 497,963

[52] U.S. Cl. .............................. 33/125 T; 33/178 E
[51] Int. Cl.² ............................................. G01B 7/12
[58] Field of Search ............ 33/178 E, 125 T, 172 E

[56] References Cited
UNITED STATES PATENTS

| | | | |
|---|---|---|---|
| 2,669,864 | 2/1954 | Brewster | 73/37.9 |
| 3,006,183 | 10/1961 | Baker | 73/37.9 |
| 3,065,628 | 11/1962 | Gesell | 73/37.9 |
| 3,332,153 | 7/1967 | Loewen | 33/125 T |
| 3,471,934 | 10/1969 | Miller et al | 33/172 E |
| 3,482,323 | 12/1969 | Hamel et al | 33/172 E |

*Primary Examiner*—Richard E. Aegerter
*Assistant Examiner*—Michael H. Thaler
*Attorney, Agent, or Firm*—R. S. Sciascia; Paul S. Collignon

[57] ABSTRACT

A measuring device for a ring comprising a linear variable differential transformer mounted on a pin gauge for providing a voltage proportional to ring dimension. A compensation circuit comprised of two thermistors is used for correcting dimensional error due to the difference in temperature of the ring and the pin gauge. Each thermistor provides an output voltage which is combined in a first adder and the output of the first added and the voltage output of the differential transformer are combined in a second adder to provide an output proportional to ring diameter and corrected for temperature difference.

2 Claims, 2 Drawing Figures

TEMPERATURE COMPENSATED MEASURING GAUGE

BACKGROUND OF THE INVENTION

The present invention relates to a gaging device and more particularly to a gaging device that provides an output voltage proportional to dimension, and having a temperature compensating circuit for correcting errors due to difference in temperature of the workpiece being measured and the gage.

When large workpieces, such as large diameter metal rings, are being machined to a high degree of accuracy, dimensional measurement has always been tedious and not always error free. A difference in temperature between the workpiece and the measuring device can cause measurement errors which will exceed allowable tolerances. In the past, therefore, calculation had to be made for each measurement to compensate for temperature difference, or else it was necessary to wait until the workpiece and the metal ring reached the same temperature.

SUMMARY OF THE INVENTION

The present invention relates to a measuring device having means for automatically compensating for error due to a difference in temperature between a workpiece and a measuring device. A linear variable differential transformer is mounted on a pin gauge bar and at one given position the voltage output of the linear variable differential transformer is zero. At positions on either side of the given point, the voltage output will be either plus or minus. By way of example, the given position, or zero point, is calibrated against a standard maintained at 78 ° F. As the diameter of the ring to be measured increases, due to an increase in temperature, the voltage from the linear variable differential transformer increases. A compensation circuit consisting of two thermistor probes are mounted in a bridge circuit and one probe measures the temperature of the workpiece and the other probe measures the temperature of the pin guage. Output voltages from the two probes are combined in a first adder circuit and the output of the first adder circuit is combined with the output of the linear variable differential transformer. The resultant output of the second adder is a reading directly proportional to the dimension of the workpiece, and corrected for temperature difference between the workpiece and the measuring device.

It is therefore a general object of the present invention to provide a temperature compensated pin gauge for measuring a workpiece.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
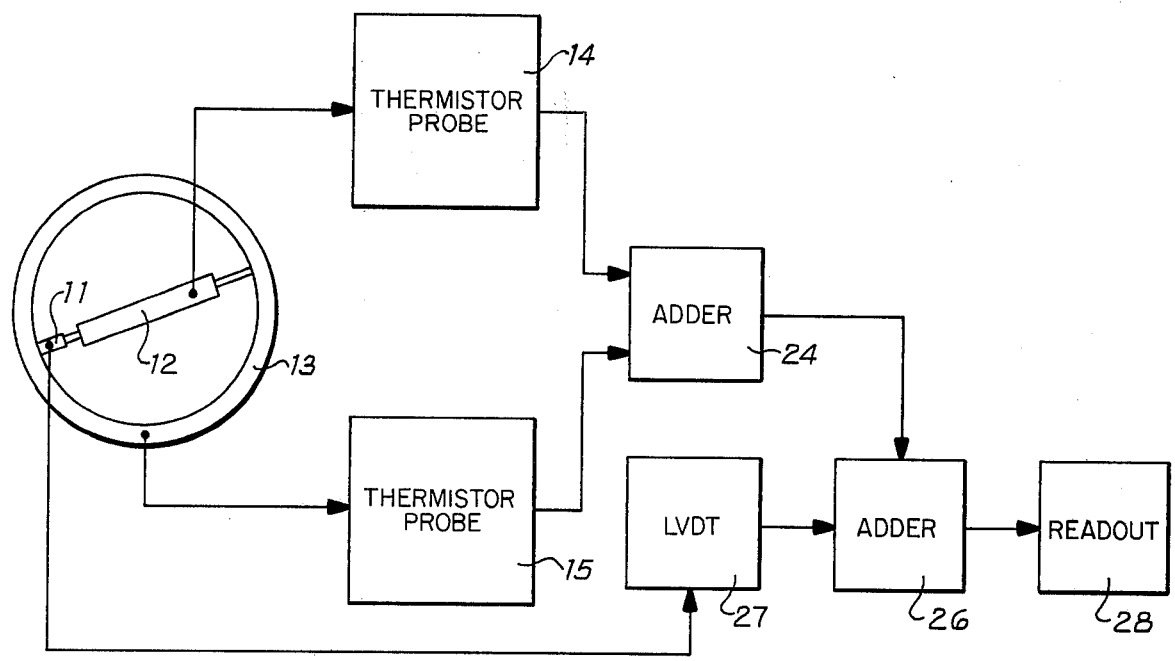
FIG. 1 is a block diagram of a preferred embodiment of the present invention.

Referring now to FIG. 1 of the drawing, there is shown a linear variable differential transformer gage head 11 mounted on a pin gauge bar 12. By way of example, linear variable differential transformer gage head 11 might be purchased from Schaevitz Engineering, Camden, N. J. 18101. The Linear Variable Differential Transformer (LVDT) is an electro-mechanical transducer which produces an electrical output proportional to the displacement of a separate movable core. Three coils are equally spaced on a cylindrical coil form. A rod-shaped magnetic core positioned axially inside this coil assembly provides a path for magnetic flux linking the coils. When the primary or center coil is energized voltages are induced in the two outer coils. In the transformer installation the outer or secondary coils are connected in series opposition, so that the two voltages in the secondary circuit are opposite in phase, the net output of the transformer being the difference of these voltages. For one central position of the core this output voltage will be essentially zero. This is called the balance point or null position. When the core is moved from this balance point, the voltage induced in the coil toward which the core is moved increases, while the voltage induced in the opposite coil decreases. This produces a differential voltage output from the transformer which, with proper design, varies linearly with change in core position. Motion of the core in the opposite direction, beyond the null position, produces a similar linear voltage characteristic, but with the phase shifted 180°. A continuous plot of voltage output versus core position (within the linear range limits) appears as a straight line through the origin if opposite algebraic signs are used to indicate opposite phases. The zero position of the LVDT is calibrated against a standard maintained at 78° F.

Figure 2:
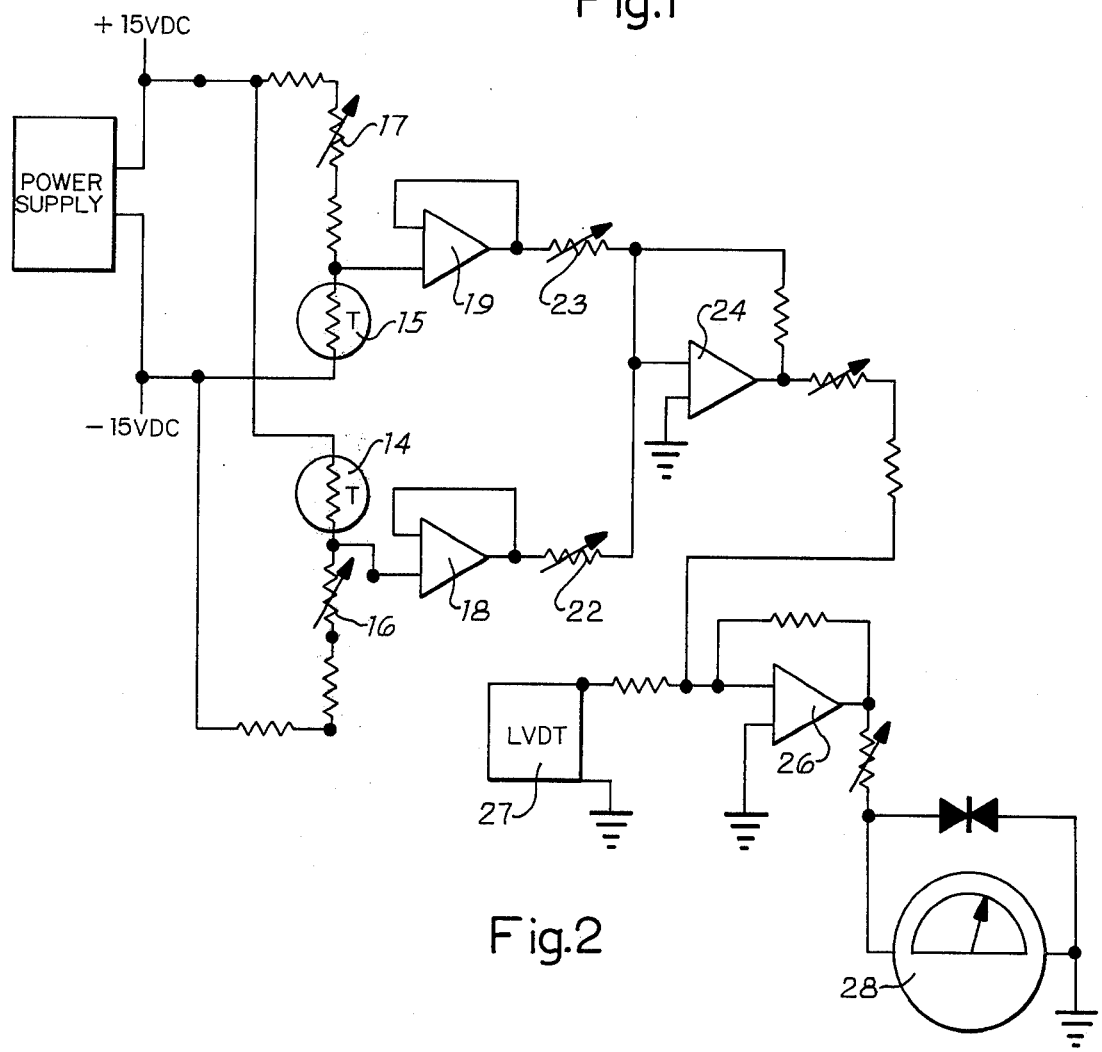
FIG. 2 is a schematic diagram of a preferred embodiment of the present invention.

FIG. 1 of the drawing shows a workpiece or ring 13 being measured and the inner diameter of ring 13 increases with an increase of temperature and, accordingly, the voltage output of the LVDT increases to give an erroneous reading. A compensation circuit is provided to correct for error due to temperature and consists of two thermistor probes 14 and 15 each mounted as half of a bridge circuit, as shown in FIG. 2 of the drawing. Thermistor 14 is connected or attached to pin gauge bar 12 and thermistor 15 is connected or attached to ring 13. Resistors 16 and 17 are provided to vary the resistance of the legs of the bridges so that the output is zero at 78 degrees F. Two buffer stages 18 and 19 insulate the bridges and resistors 22 and 23 are provided to calibrate the level of the output of one bridge circuit with the other. The outputs from the two bridge circuits are added in adder 24. A Resistor is provided in order to calibrate the output of the compensation circuit. A second adder 26 adds the compensation voltage from adder 24 with the voltage output from the LVDT 27 and this resultant voltage is indicated on a readout, such as a meter 28.

OPERATION

In operation, workpiece 13 might still be positioned in a machine tool, such as a lathe and, immediately after being worked-upon, workpiece 13 is at a temperature substantially greater than the ambient temperature. Pin gauge bar 12, having LVDT gage head 11 thereon, is positioned so as to measure the inside diameter of workpiece 13. Thermistor probe 14 is then electrically connected to pin gauge bar 12 and thermistor probe 15 is electrically connected to workpiece 13. Upon energization, LVDT gage head 11 provides a voltage output proportional to the diameter of workpiece 13 and this output is applied to adder 26. Thermistors 14 and 15 are used on opposite sides of two bridges and their voltage outputs are combined in adder 24 and the output of adder 24 is combined with the output of the LVDT gage head in adder 26. A readout device, such as a meter 28, is connected to the output of adder 26 and, by way of example, might be scaled to read directly in dimension, such as inches.

Obviously many modifications and variations of the present invention are possible in the light of the above teachings. For example, while the above-described operation describes the measurement of a bore, the invention might readily be adapted to measure other dimensions, such as an outside diameter. It is therefore to be understood that within the scope of the appended claims the invention may be practiced otherwise than as specifically described.

We claim:

1. A temperature compensated gauging device comprising, gauging means engageable with a workpiece for providing a first voltage output proportional to a dimension being measured, a first thermistor for measuring the temperature of said workpiece and providing a second voltage output proportional to the temperature of said workpiece, a second thermistor for measuring the temperature of said gauging means and providing a third voltage output proportional to the temperature of said gauging means, a first amplifier for combining said second and third voltage outputs and providing a temperature compensating voltage output, a second amplifier for combining said first voltage output and said temperature compensating voltage output to provide a temperature compensated output voltage proportional to a dimension of said workpiece, and a readout device for indicating the magnitude of said temperature compensated output voltage.

2. A temperature compensated gauging device as set forth in claim 1 wherein said gauging means engageable with a workpiece for providing a first voltage output is a linear variable differential transformer.

* * * * *